Oct. 31, 1933.   J. COLAIZZI   1,933,470
KITCHEN UTENSIL
Filed May 18, 1932   2 Sheets-Sheet 2

John Colaizzi
INVENTOR
BY Victor J. Evans & Co.
ATTORNEY

Patented Oct. 31, 1933

1,933,470

UNITED STATES PATENT OFFICE 1,933,470

KITCHEN UTENSIL

John Colaizzi, Pittsburgh, Pa.

Application May 18, 1932. Serial No. 612,147

3 Claims. (Cl. 4—187)

The invention relates to a kitchen utensil and more particularly to sanitary containers for use beneath kitchen sinks.

The primary object of the invention is the provision of a device of this character, wherein a sliding drawer is adapted to be mounted beneath a kitchen sink and constitutes a receptacle for accommodation of various cleaning materials, for example, soaps, scrubbing cloths or any mediums used for household cleaning, while beneath this drawer is a bucket or other receptacle, which likewise is designed for receiving household cleaning mediums, as for example, scrubbing brushes, dusting cloths or sponges, the receptacle being readily accessible for the removal of these mediums or the storing of the same therein, the device in its entirety being of novel construction.

Another object of the invention is the provision of a device of this character, wherein the bucket or other like receptacle as mounted beneath a kitchen sink is rendered sanitary by a closure to exclude vermin, dirt and dust therefrom, whereby the cleaning mediums as may be held therein will be readily and easily accessible for use, the device when not in use being confined beneath the sink and out of the way, it being handy for service and it is not unsightly to the eye of a person.

A further object of the invention is the provision of a device of this character which is extremely simple in construction, thoroughly reliable and efficient for its purposes, readily and easily operated, adaptable for the reception of cleaning mediums useful in the household, and also inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Similar reference characters indicate corresponding parts throughout the several views in the drawings.

Figure 1:
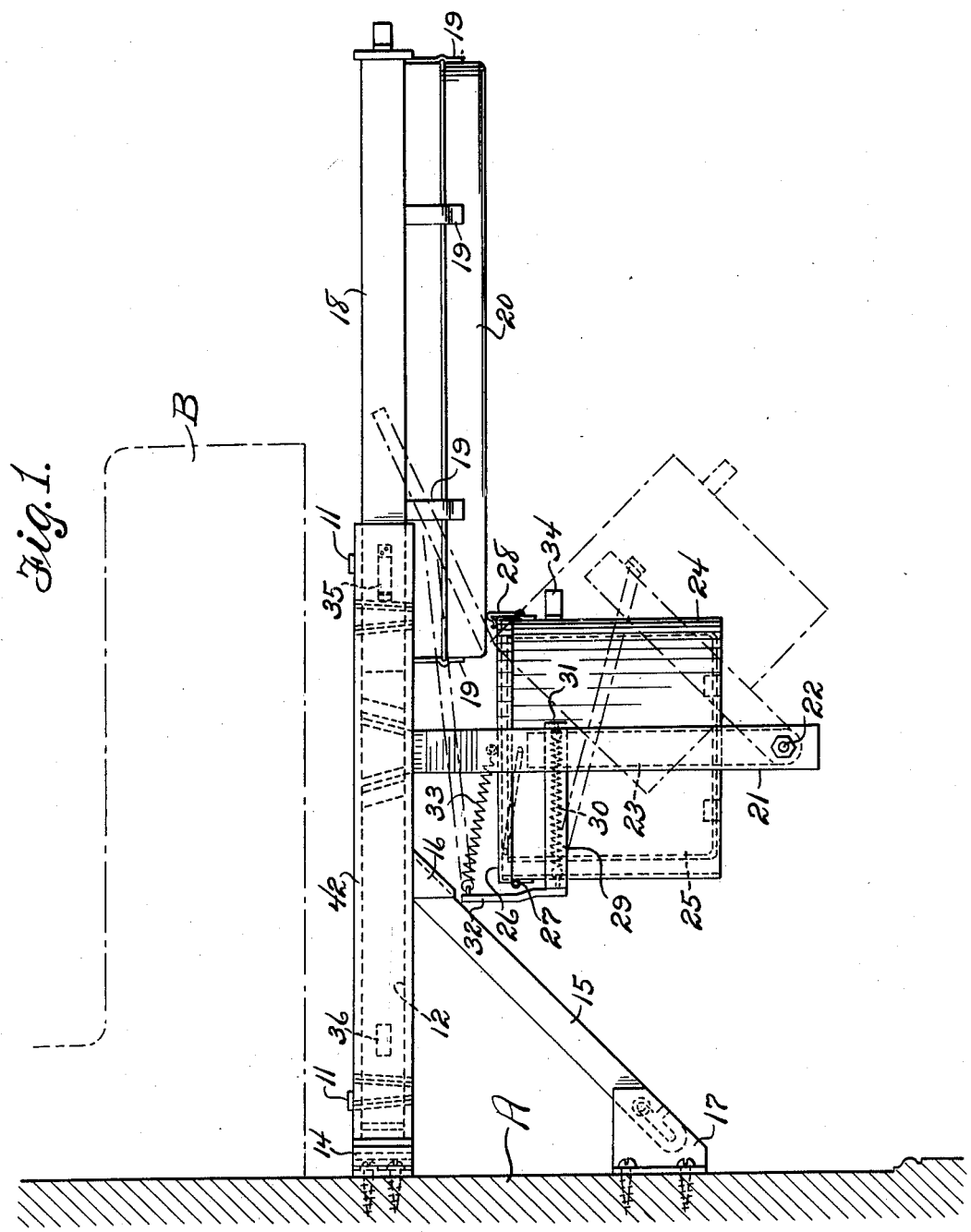
Figure 1 is a side elevation of the device constructed in accordance with the invention, the slide drawer being pulled outwardly, while by full lines the bucket or other like receptacle is shown in normal position and by dotted lines in adjusted position for free access thereto.

Referring to the drawings in detail, A designates generally a portion of a side wall of an inclosure and B a standard kitchen sink, while adapted for mounting beneath the latter is the device constituting the present invention and hereinafter fully described.

Figure 2:
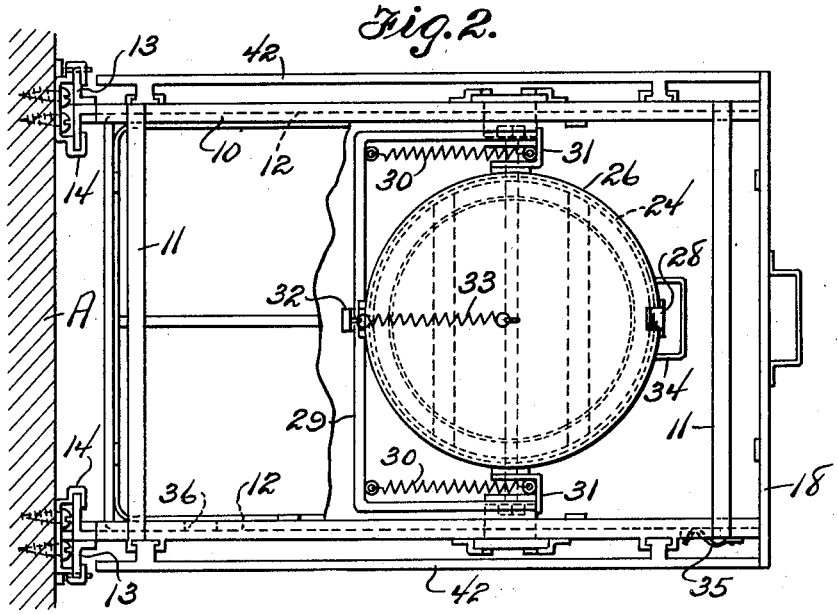
Figure 2 is a top plan view of the device, the drawer and bucket or other like receptacle being in normal position.
Figure 3:
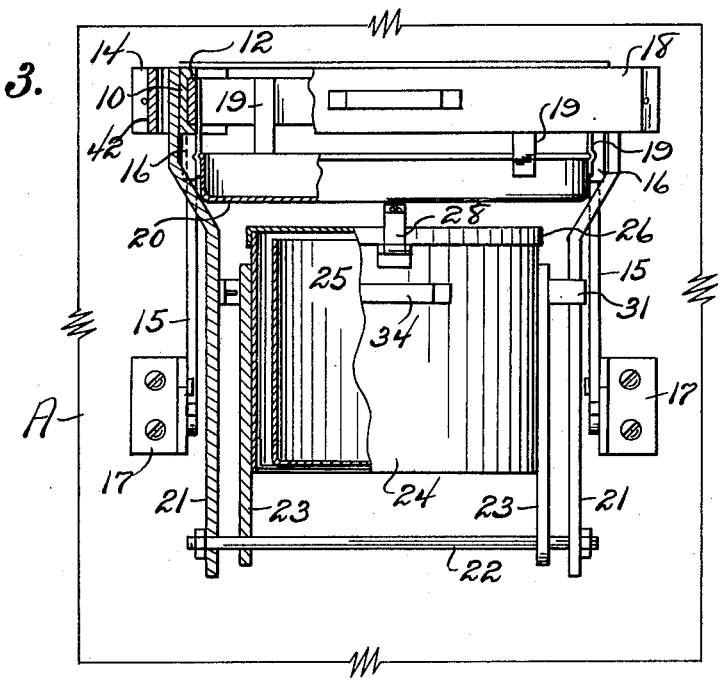
Figure 3 is an end elevation, the same being partly broken away to disclose adjuncts.

The device comprises a frame including the side members 10 and cross top connecting pieces 11, these being preferably integrally formed with the sides 10, the latter constituting guide tracks 12 at their inner faces. The inner ends of the sides 10 of the frame are formed with attaching heads 13 preferably of wedge formation and are detachably received in jaw-like cleats 14 secured in any suitable manner to the wall A at the proper point or location below the sink. The frame is supported by removable braces 15, these engaging in the triangular-shaped socketed extensions 16 on the sides 10 and also detachably engaged with brackets 17 fixed to the wall A in a manner as is clearly shown in Figures 1, 2 and 3 of the drawings so that the said frame will be firmly supported in a horizontal plane.

Slidably fitted in the frame by engaging the tracks 12 of the sides 10 thereof is a drawer 18 having an open bottom, while fixed to opposite sides and ends of this drawer 18 are depending spring clips or hangers 19 for the mounting of a tray or pan 20 which is spaced beneath the drawer 18 and this pan or tray is designed to accommodate soaps and other cleaning mediums, as for example, steel wool. The tray or pan 20 is readily separable from the drawer 18 by releasing the hangers 19 connecting such tray or pan therewith.

Detachably coupled with the sides 10 are depending hangers 21 supporting a horizontally disposed pivot shaft 22 carrying rocking arms 23, these supporting a bucket or other like receptacle 24 having therein a removable holder 25. The bucket or other like receptacle 24 is open at its top and normally covered by a lid or closure 26 hinged at 27 and latched in covering position by a spring catch 28, the same being diametrically opposite the hinge 27. Secured to the hangers 21 and extended rearwardly of and about the bucket or other like receptacle 24 is a yoke 29 to which are connected coiled tensioning springs 30, these being also connected with the arms 23 which are provided with stops 31 to limit the swinging of the bucket or other like receptacle 24 in one direction while the springs 30 become active when the bucket or other like receptacle 24 is swung in an opposite direction whereby it will be returned to normal position when released from the hand of an operator and this normal position is clearly shown in Figures 1 and 2 of the drawings.

The yoke 29 at its center has an upstanding post 32 to which is connected a coiled tensioning spring 33, the same being also connected centrally to the lid or closure 26 whereby on the forward tilting of the bucket or other like receptacle 24 and the release of the catch 28 the lid or closure 26 will be automatically raised or swung to open position. The bucket or other like receptacle 24 at its forward side is provided with a handle or pull bail 34 whereby it may be swung outwardly or forwardly with the shaft 22 as its axis of movement. When the bucket or other like receptacle 24 is released by an operator freeing his hand from the handle 34 the springs 30 become active to retract or move the bucket or other like receptacle 24 to the full line position shown in Figure 1 of the drawings which is normal position of said bucket or other like receptacle. In this position the lid or closure 26 automatically covers the open top of the bucket or other like receptacle and thereafter the latch 28 can be thrown for locking engagement with such lid or closure. This bucket or other like receptacle, by the holder 22 removably fitted therein, is adapted for the reception of scrubbing brushes, sponges or other cleaning mediums so that these may be concealed from view when not in use and conveniently stored within the bucket or other like receptacle.

The side 10 of the frame for the drawer 18 carries a spring stop 35 to cooperate with a seat 36 in the side of the drawer 18 to limit the outward sliding movement of the latter and to obviate the accidental pulling of the drawer out of the tracks 13 formed with the sides 10 of the frame.

The device is designed for the accommodation of cleaning materials, such as soaps, sponges, scrubbing brushes, wash cloths, dusting cloths, dusting brushes and other cleaning mediums usable for the household and when held will assure sanitation and are readily accessible for use.

The lid or closure 26 for the bucket or other like receptacle 24 renders the latter vermin-proof and also sanitary.

What is claimed is:—

1. A device of the character described comprising a frame, a drawer slidably fitted within the frame and having an open bottom, a receptacle suspended from the frame, means for detachably mounting the frame, means for tilting the receptacle, and a tensioned closure for the receptacle and closing the latter when upright.

2. A device of the character described comprising a frame adapted for mounting beneath a kitchen sink, a drawer slidably fitted within the frame and having an open bottom, spring hangers on the drawer, a tray removably held by the spring hangers suspended beneath the drawer, a receptacle suspended from the frame, means for detachably mounting the frame, means for tilting the receptacle, a closure for the receptacle, and tensioning means for opening the closure on the tilting of the receptacle.

3. A device of the character described comprising a frame adapted for mounting beneath a kitchen sink, a drawer slidably fitted within the frame and having an open bottom, spring hangers on the drawer, a tray removably held by the spring hangers suspended beneath the drawer, a receptacle suspended from the frame, means for detachably mounting the frame, means for tilting the receptacle, a closure for the receptacle, tensioning means for opening the closure on the tilting of the receptacle, and means for tensioning the receptacle when tilted.

JOHN COLAIZZI.